United States Patent [19]

Harsacky

[11] 4,219,103
[45] Aug. 26, 1980

[54] ELEVATOR PLATFORM STRUCTURE

[75] Inventor: Thomas P. Harsacky, Cincinnati, Ohio

[73] Assignee: Leyman Manufacturing Corp., Cincinnati, Ohio

[21] Appl. No.: 921,591

[22] Filed: Jul. 3, 1978

[51] Int. Cl.² ............................................. B60S 13/00
[52] U.S. Cl. .................................... 187/8.49; 292/238
[58] Field of Search ................ 187/1 R, 6, 8.52, 97, 187/8.49; 292/231, 238, 235, 216; 16/DIG. 32, 175, 177, 137, 147

[56] References Cited

U.S. PATENT DOCUMENTS

| 289,616 | 12/1883 | Cawley | 172/435 |
|---|---|---|---|
| 637,840 | 11/1899 | Wilkey | 172/68 |
| 1,509,375 | 9/1924 | Nolan | 187/97 |
| 2,288,926 | 7/1942 | Strader | 296/57 R |
| 2,671,683 | 3/1954 | Heyman et al. | 292/238 |
| 2,963,178 | 12/1960 | Walker | 214/14 |
| 3,054,519 | 9/1962 | Fleming | 214/512 |
| 3,172,501 | 3/1965 | Ramer | 187/9 |
| 3,341,042 | 9/1967 | Carder | 214/512 |
| 3,521,775 | 7/1970 | Vermette | 214/512 |
| 3,702,645 | 11/1972 | Shaw | 187/18 |
| 3,737,009 | 6/1973 | Stoddard | 187/17 |
| 3,749,201 | 7/1973 | Clarke | 187/9 |
| 3,872,948 | 3/1975 | Richards | 187/8.52 |
| 3,905,626 | 9/1975 | Myers | 292/216 |
| 3,945,469 | 3/1976 | Dorcich | 187/6 |
| 4,063,619 | 12/1977 | Drews | 187/17 |

FOREIGN PATENT DOCUMENTS 774224  5/1957  United Kingdom ................ 296/57 R

*Primary Examiner*—Kenneth W. Noland
*Attorney, Agent, or Firm*—Wood, Herron & Evans

[57] ABSTRACT

An improved elevator platform structure of the type that includes a framework and a horizontally disposed elevator platform, the platform being raised and lowered by hydraulic rams connected to the framework. The elevator platform includes a pivotable ramp at one edge thereof, the pivotable ramp being biased into a horizontal attitude in which the elevator platform may be loaded or unloaded over that ramp, and into a vertical attitude at which that ramp functions as a stop as the platform is raised or lowered. A reciprocable safety foot structure is connected to the framework, and is automatically movable into an active position underneath the pivotable ramp when the platform is in its uppermost position. This safety foot structure insures that, as the platform is lowered from its uppermost position, the ramp will be pivoted from the horizontal attitude toward the vertical attitude, thereby locating the pivotable ramp in its stop position.

5 Claims, 5 Drawing Figures

U.S. Patent    Aug. 26, 1980    4,219,103
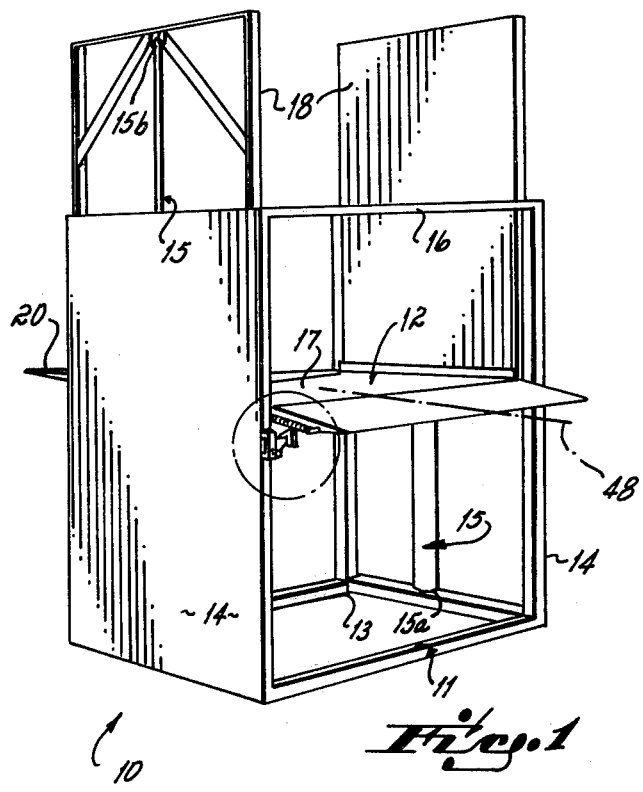
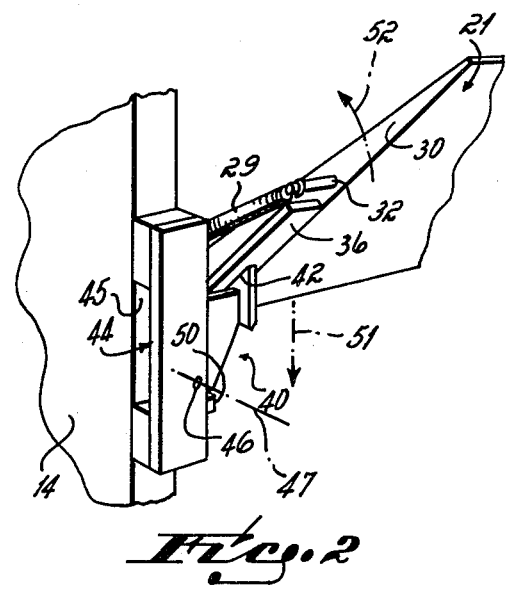
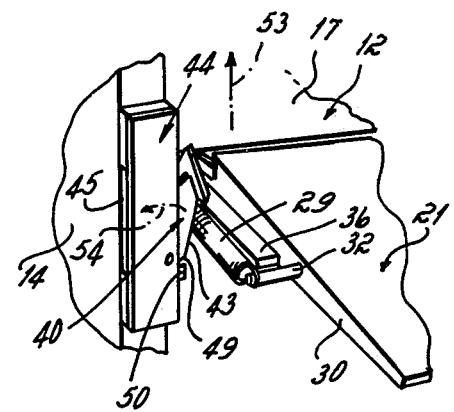
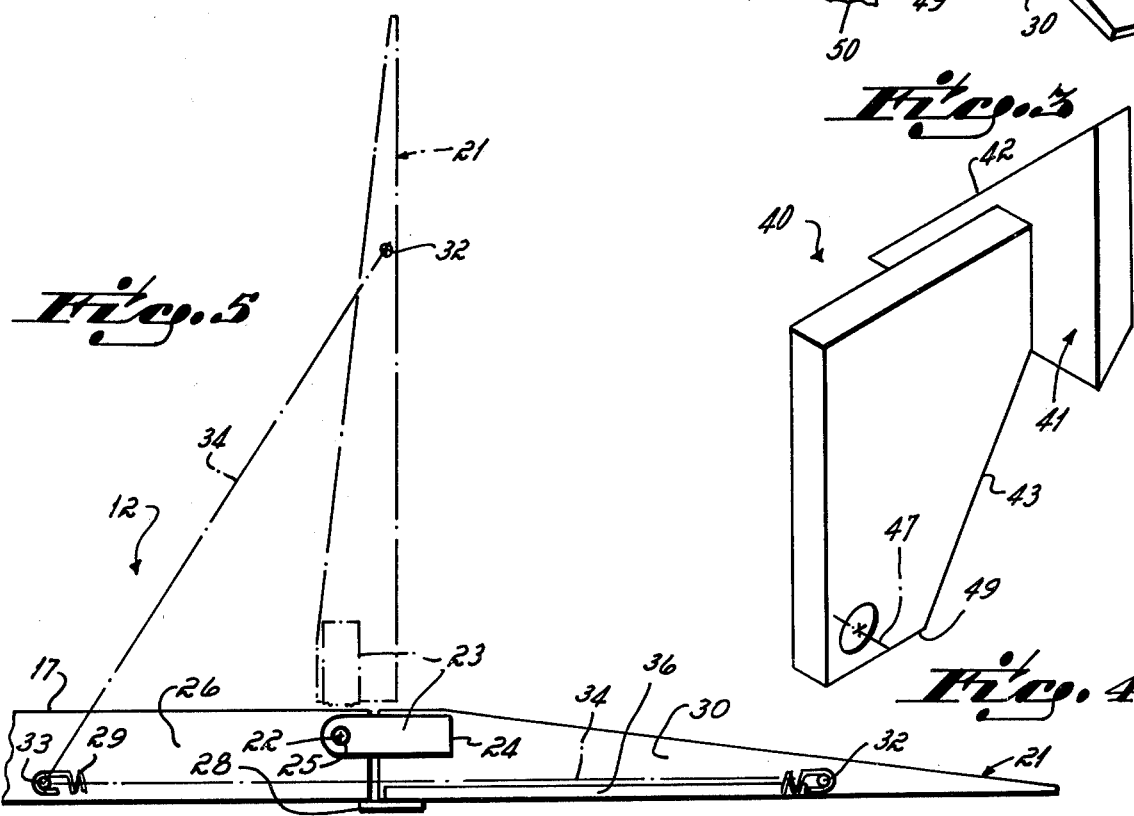

ELEVATOR PLATFORM STRUCTURE

This invention relates to an improved elevator platform structure.

Loading and unloading an over-the-road trailer, i.e., a tractor trailer, at a location at which there are no dock facilities, e.g., a retail store, can present a problem. In other words, the loading or unloading goods between the elevated trailer's floor and ground level can prove burdensome in the case of heavy goods at a remote location where no mechanical unloader (e.g., forklift truck) is available. One way to solve this situation is to provide the trailer with an elevator platform integral with, i.e., mounted on, the rear end of the trailer. Typical of integrated elevator platform structures are those illustrated in U.S. Pat. Nos. 3,371,805 and 3,785,678, both assigned to the assignee of this application. The elevator platform structures disclosed in these patents have operated successfully in commercial practice, and have been proven satisfactory as one structural solution to the loading/unloading problem for a trailer where no dock facilities are present.

However, not all tractor trailers are provided with integral elevator platform structures. The loading/unloading problem remains, therefore, in those loading or unloading locations with no dock, and where the trailer itself is not provided with an integrated cargo elevator. In this latter situation, it is known to provide a stationary elevator platform particularly adapted to move between ground level and the elevated floor level of the trailer when the trailer is back into operational relation therewith. Typical of this type elevator platform structure is that illustrated in U.S. Pat. No. 4,063,619, also assigned to the assignee of this application.

The improved elevator platform structure disclosed in U.S. Pat. No. 4,063,619 has an access ramp on one end of the elevator platform that is movable between a horizontal first position where same permits ingress and egress off that end of the elevator platform, and a vertical second position where same effectively functions as a stop. The pivotable ramp is spring loaded so as to restrain the ramp in both the horizontal and vertical use positions, and so as to permit operational cooperation of the ramp with, e.g., the floor of a trailer during lowering of the ramp relative to that floor. In orther words, the ramp is automatically movable between the horizontal use position and the vertical stop position when the ramp engages the trailer's floor during lowering of the ramp relative to that floor, all as shown and described in the patent. However, when the elevator platform is lowered, and when the movable ramp is not in position to operationally cooperate with the trailer's floor, or when the cooperation with the trailer's floor fails to provide the desired translation of the ramp from the horizontal to the vertical position, the ramp loses its stop function as the elevator platform is lowered from its uppermost position to ground level.

Therefore, it has been the primary objective of this invention to provide an imporved elevator platform structure that incorporates a novel safety foot structure automatically positionable in the operative attitude when the elevator platform is in its uppermost position, and automatically movable out of its operative attitude as the elevator platform moves from its lowermost position to its uppermost position, that is adapted to cooperate with a pivotable platform ramp for insuring that the ramp is translated from a horizontal ingress/egress position to a vertical stop position as the elevator platform is lowered from its uppermost to its lowermost position during use.

In accord with this objective, and in preferred form, the improved elevator platform structure of this invention includes a framework and a horizontally disposed elevator platform, the platform being raised and lowered by hydraulic rams connected to the framework. The elevator platform includes a pivotable ramp at one end thereof, the pivotable ramp being biased into a horizontal attitude in which the elevator platform may be loaded or unloaded over that ramp, and into a vertical attitude at which that ramp functions as a stop as the platform is raised or lowered. A reciprocable safety foot structure is connected to the framework, and is automatically movable into an active position underneath the pivotable ramp when the platform is in its uppermost position. This safety foot structure insures that, as the platform is lowered from its uppermost position, the ramp will be pivoted from the horizontal attitude toward the vertical attitude, thereby locating the pivotable ramp in its stop position.

Other objectives and advantages of this invention are more apparent from the following detailed description taken in conjunction with the drawings in which:

FIG. 1 is a perspective view illustrating an improved elevator platform structure of this invention in its uppermost position;

FIG. 2 is a perspective view of that area encircled in FIG. 1, and illustrating the cooperative relation of safety foot and pivotable ramp as the elevator is lowered;

FIG. 3 is a persepctive view similar to FIG. 2, but showing the cooperative relation of the safety foot and the pivotable ramp as the elevator is raised;

FIG. 4 is a perspective view of the safety foot itself; and

FIG. 5 is a side view of the pivotable ramp and a portion of the elevator platform.

The improved elevator platform structure 10, as illustrated in FIG. 1, includes a framework 11 and an elevator platform 12. The framework 11 is adapted to rest on the ground, and may be fixed thereto or not as desired by the user. The elevator framework 11 includes a horizontal base frame 13 and vertical, opposed side frames 14 fixed together in a connected configuration. Each side frame 14 is in the nature of an outer mast assembly, the outer mast assemblies therefore being positioned parallel one to the other for raising and lowering the platform 12 relative to ground level through use of hydraulic rams 15. The elevator framework 11 also includes a safety bar or handrail 16 located normal to the two outer side mast assemblies 14. Thus, the safety rail 16 is mounted in a structurallly rigid and immobile manner relative to the rest of the elevator framework 13, 14 and relative to the elevator platform 12 itself.

The elevator platform 12 includes a center platform section 17 that is structurally rigid. The center platform section 17 of the elevator platform mounts an inner mast assembly 18 on each of the opposed side edges thereof, the inner mast assemblies being vertically upstanding relative to the horizontal plane of the center platform section and being parallel to the outer mast assemblies 14. Each hydraulic ram 15 is connected at one end (as at 15a) to the base frame 13 and at the other end (as at 15b) to the elevator platform 12, the inner 18 and outer 14 mast assemblies cooperating to guide the platform's vertical motion in response to operation of rams 15.

This basic framework 11 and elevator platform 12 structure is more particularly illustrated and described in U.S. Pat. No. 4,063,619, the disclosure of which is incorporated herein by reference.

A first ramp 20 is connected to one end edge of the center platform section 17 along the entire width of that section, that first ramp being pivotably mounted relative to the center section. This ramp 20 is normally in that attitude illustrated in FIG. 1, but is free to pivot upward if it is inadvertently lowered onto an object, for example, the toe of an operator. This ramp 20, of course, permits ingress and egress to the center platform section from that end.

A second ramp 21 is connected along the other end edge of the center platform section, that second ramp 21 being pivotally connected to the center platform section along pivot axis 22 adjacent to that other edge, see FIG. 5. The second ramp 21 is connected at each side to the center elevator section 17 by arm member 23, each arm being rigidly fixed at one end 24 to the ramp 21 and being pivotally connected by a pin 25 at the other end to side rail plate 26 of the platform's center portion. The pins 25, of course, define pivot axis 22. The ramp 21, in its lowered position, rests on a ledge or stop 28 and in this attitude the ramp is positioned to permit ingress and egress, e.g., of cargo carts on wheels, from the center platform section 17 when the elevator platform 12 is in an off-ground or on-ground attitude. A tension spring 29 interconnects each side edge 30 of the second ramp 21 with its related side edge 26 of the center platform section 17. The tension spring 29 is connected at one end to pin 32 fixed to the ramp 21, and connected at the other end to pin 33 fixed to the center elevator section. Note particularly the orientation of tension spring 29 relative to the pivot axis 22 of the rear ramp section in both the horizontal or load/unload attitude illustrated in solid lines in FIG. 5, and the upraised or stop attitude illustrated in phantom lines in FIG. 5, when the spring is viewed from a line of sight coaxial with pivot axis 22. In the lowered or normal ramp attitude, the axis 34 of each tension spring is disposed on one side of (i.e., below) the pivot axis 22 of the ramp, thereby positively restraining the ramp in the solid line or ramp operative attitude shown in FIG. 5. When the axis 34 of the tension spring 29 is located on the other side, or over center, of the ramp's pivot axis 22, the ramp 21 is in the stop or upraised attitude illustrated in phantom lines in FIG. 5, thereby also positively restraining the ramp in the stop attitude.

The safety foot structure 40 is particularly illustrated in FIG. 4. As shown in that figure, the safety foot structure 40 includes a stop foot 41 that defines a close cam edge 42, and a release cam edge 43. Note the close cam edge 42 is in a vertical plane transverse to a vertical plane that includes the release cam edge 43 when the stop foot 41 is in its active position shown in FIG. 2. The safety foot 41 is pinned between structural members 44, 45 of the framework 11 by pin 46, and is adapted to pivot on axis 47 disposed generally horizontal and parallel to ground, see FIGS. 2 and 3. Further, and importantly, the pivot axis 47 of the safety foot 40 is disposed parallel to the general center line 48 of the elevator platform 12, and is transverse to the vertical plane that incorporates release cam edge 43, when the stop foot 41 is in its active position. The safety foot 40 is not spring loaded, but it is gravity biased so that, when unhindered, it falls into the active attitude illustrated in FIG. 2 due to the heavy weight of the safety foot which tends to pivot the safety foot clockwise, as illustrated in FIG. 2, about the pivot axis 47. The safety foot 41 is located in this active position by an abutment of end edge 49 against stop block 50 fixed to the structural members 44, 45.

In use, and in the active attitude, as the elevator platform 12 descends from its uppermost position shown in FIG. 1 toward ground (note phantom arrow 51 in FIG. 2), the ramp 21 contacts the safety foot 40 outboard of the ramp's pivot axis 22 connection with the main platform section 17, i.e., the foot's close cam edge 42 engages foot plate 36 fixed to the ramp 21, thereby causing the ramp to pivot counter-clockwise as shown in FIG. 2 (note phantom arrow 52) which causes the ramp to pivot toward the stop position shown in phantom lines in FIG. 5. Of course, once the spring axis 34 has passed over the pivot axis 22 of the ramp 21, the spring 29 itself serves to draw the ramp up to the stop position shown in phantom lines in FIG. 5. When the elevator platform 12 reaches ground, the pivotable ramp 21 is kicked down into the horizontal ingress/egress position shown in FIG. 1. Subsequently, and when the elevator paltform 12 is raised, the safety foot 40 is automatically moved out of the way, the foot normally remaining in the active position shown in FIG. 2 because it is constantly gravity biased into that position. As the elevator platform 12 is raised (see phantom arrow 53 in FIG. 3), the spring 29 on the platform contacts cam edge 43 of the safety foot 40 with the result that the safety foot is cammed or pivoted (as shown by phantom arrow 54) about its pivot axis 47 into a temporary storage position shown in FIG. 3. In this temporary storage position, of course, the ramp 21 can continue upward movement from a lowermost position, not shown, to the uppermost position shown in FIG. 1.

Having described in detail the preferred embodiment of my invention, what I desire to claim and protect by Letters Patent is:

1. An improved elevator platform structure comprising an elevator platform horizontally carried within a framework, said elevator platform being movable within said framework between a lower level and an upper level, a lifting device connecting said elevator platform and said framework, said lifting device being adapted to raise and lower said horizontal elevator platform between said upper and lower levels as desired by an operator, a pivotable ramp at one end edge of said platform, said ramp being pivotable on an axis between a first position at which said ramp is substantially horizontal with said elevator platform, and a second position at which said ramp is vertically upraised relative to said elevator platform, and a safety foot connected with said framework, said safety foot being pivotable about a pivot axis oriented generally parallel to the ingress/egress path of said elevator platform, said safety foot being automatically and continually biased downward by gravity into an active position at which said foot engages said ramp as said elevator platform is lowered from said upper level to said lower level to pivot said ramp from said horizontal position toward said vertically upraised position, and said safety foot being automatically pivoted upward against said gravity bias from said active position as said elevator platform is upraised from said lower level to said upper level by contact of said foot with said ramp structure to permit said elevator platform to pass from said lower level to said upper level without hindrance by said safety foot.

2. An improved elevator platform structure as set forth in claim 1, said safety foot defining a release cam edge operatively engageable with said ramp structure, said ramp structure cooperating with said release cam edge to cam said safety foot into a temporary storage position as said elevator platform rises from said lower level to said upper level, said safety foot remaining gravity biased downward in said temporary storage position.

3. An improved elevator platform structure as set forth in claim 2, said safety foot defining a close cam edge operably engageable with said elevator platform ramp structure, said close cam edge cooperating with said ramp structure to cam said ramp into a generally vertical position as said elevator platform lowers from said upper level to said lower level.

4. An improved elevator platform structure as set forth in claim 3, said close cam edge being in a vertical plane generally transverse to a vertical plane that includes said release cam edge, and said release cam edge being in a vertical plane generally transverse to a vertical plane that includes the ingress/egress path of said elevator platform.

5. An improved elevator platform structure as set forth in claim 1, said elevator platform and said ramp structure comprising spring means connected between said ramp and said elevator platform, said spring means biasing said ramp to said vertical position after said ramp has been raised upward by said safety foot as said elevator platform moves from said upper level to said lower level.

* * * * *